US011979503B2

(12) United States Patent
Merz et al.

(10) Patent No.: US 11,979,503 B2
(45) Date of Patent: May 7, 2024

(54) METHOD FOR A SECURE TRANSMISSION, AND METHOD FOR A SECURE BIDIRECTIONAL EXCHANGE OF ELECTRONIC DATA PACKETS IN A NETWORK

(71) Applicant: UBIRCH GMBH, Cologne (DE)

(72) Inventors: Michael Merz, Berlin (DE); Matthias Jugel, Berlin (DE)

(73) Assignee: UBIRCH GMBH, Cologne (DE)

( * ) Notice: Subject to any disclaimer, the term of this patent is extended or adjusted under 35 U.S.C. 154(b) by 345 days.

(21) Appl. No.: 17/046,328

(22) PCT Filed: Apr. 10, 2019

(86) PCT No.: PCT/EP2019/059096
§ 371 (c)(1),
(2) Date: Oct. 9, 2020

(87) PCT Pub. No.: WO2019/197473
PCT Pub. Date: Oct. 17, 2019

(65) Prior Publication Data
US 2021/0105141 A1    Apr. 8, 2021

(30) Foreign Application Priority Data
Apr. 11, 2018    (EP) .................................... 18166847

(51) Int. Cl.
*H04L 9/32*    (2006.01)
*H04L 9/30*    (2006.01)

(52) U.S. Cl.
CPC .......... *H04L 9/3247* (2013.01); *H04L 9/3073* (2013.01)

(58) Field of Classification Search
None
See application file for complete search history.

(56) References Cited

U.S. PATENT DOCUMENTS

| | | | | |
|---|---|---|---|---|
| 2003/0182552 A1* | 9/2003 | Tanimoto | .............. | H04L 9/3265 713/170 |
| 2004/0006692 A1* | 1/2004 | Honda | .................. | H04L 9/3247 713/157 |
| 2013/0166917 A1 | 6/2013 | Granbery | | |

FOREIGN PATENT DOCUMENTS

| | | |
|---|---|---|
| DE | 10234815 A1 | 2/2004 |
| DE | 202012101671 U1 | 5/2012 |
| DE | 102015202935 A1 | 8/2016 |
| JP | 2008136247 A | 6/2008 |
| WO | WO-2012153530 A1 * 11/2012 | ......... H04L 63/0823 |

OTHER PUBLICATIONS

International Search Report (in English and German) and Written Opinion of the International Searching Authority (in German) issued in PCT/EP2019/059096; dated Aug. 20, 2019; ISA/EP.
Chinese Office Action regarding Chinese application No. 201980025294.4 dated Jan. 29, 2024.

* cited by examiner

*Primary Examiner* — Jeffrey C Pwu
*Assistant Examiner* — Mayasa A. Shaawat
(74) *Attorney, Agent, or Firm* — Harness, Dickey & Pierce, P.L.C.

(57) ABSTRACT

The invention relates to a method for a secure transmission of electronic data packets in a network comprising network components.

14 Claims, 9 Drawing Sheets

METHOD FOR A SECURE TRANSMISSION, AND METHOD FOR A SECURE BIDIRECTIONAL EXCHANGE OF ELECTRONIC DATA PACKETS IN A NETWORK

CROSS-REFERENCE TO RELATED APPLICATIONS

This application is a 371 U.S. National Phase of International Application No. PCT/EP2019059096, filed Apr. 10, 2019, which claims priority to European Application No. 18166847.6, filed Apr. 11, 2018. The entire disclosures of the above applications are incorporated herein by reference.

The invention relates to a method for a secure transmission of electronic data packets in a network as well as a method for a secure bidirectional exchange of electronic data packets in a network.

BACKGROUND

To secure the transmission of electronic data packets or data packages between network components, each of which has one or more processors and optionally associated storage for electronic data, in a network, it is known to use encrypted data transmission protocols. In addition, authentication of the network components involved in the data transmission using certificates can be provided. This ensures that the data transmission from the sending network component to the receiving network component is trustworthy and secure. The further data transmission of the received electronic data packets by the receiving network component to another network component can then take place in the same way.

It is also known to use cryptographic keys for the transmission of data packets. For example, cryptographic key pairs are provided for network components which each comprise a public and a private key. This enables electronic data packets which are exchanged between network components to be authenticated. Usually, the electronic data packet to be transmitted is digitally signed in the sending network component using the private key of the sending network component. The unencrypted electronic data packet and the digital signature are then transmitted to the receiving network component. This has previously received the public key of the sending network component and can hereby verify the (digitally signed) electronic data packet. When verifying what is known as such, the public key is used to check whether the digital signature received comes from the sender (sending network component) of the data packet and matches the received data packet.

The prior art can only establish a transitive trustworthiness for data transmission in which all network components involved, from the sending network component to the final receiving network component, must trust each other. Furthermore, manipulation of the temporarily stored data processing and transporting network components is possible and cannot be recognized by the receiver without a complete check of the entire transmission path. A trusted data transfer via unencrypted channels is impossible.

A major weakness of the known methods (encryption on the transport route) is that the data must be decrypted for processing/analysis on the receiving network component. Once they have been decrypted, they are effectively unprotected, which is particularly serious because hacking a server is enough to question the trustworthiness of all subsequent processing steps/systems.

SUMMARY

The object of the invention is to provide an improved method for a secure transmission and exchange of electronic data packets between network components of a network which is adapted for the sending and receiving of electronic data packets by network components.

To solve this, a method for a secure transmission of data packets is provided according to independent claim 1. Furthermore, a method for a secure bidirectional exchange of electronic data packets in a network is provided according to independent claim 5. Embodiments are the subject of the dependent claims.

According to one aspect, a method for a secure transmission of electronic data packets in a network is provided. The method comprises providing network components which each have a processor for electronic data processing and are configured to send and/or receive electronic data packets in a network via data communication links between the network components. The method comprises in a first of the network components in (the context of) a first data processing operation: providing a first cryptographic key pair for digital signing with a first public and a first private key; providing a first component ID which uniquely identifies the first network component in the network; providing a first payload; generating a first electronic data packet which comprises the first component ID and the first payload; generating a first digital signature by digitally signing the first electronic data packet with the first private key; sending the first electronic data packet and the first digital signature from the first network component to a second of the network components; and sending the first public key from the first to the second network component. In (the context of) a second data processing operation, the first network component also provides for: providing a second payload which is different from the first payload; generating a second electronic data packet which comprises the first component ID, the second payload and the first digital signature; generating a second digital signature by digitally signing the second electronic data packet with the first private key; and sending the second electronic data packet and the second digital signature from the first network component to the second network component. The following is then provided for in the second network component: receiving the first electronic data packet and the first digital signature as well as the second electronic data packet and the second digital signature; storing the first electronic data packet and the first digital signature as well as the second electronic data packet and the second digital signature in a storage device which is assigned to the second network component; receiving the first public key; and storing the first public key in the storage device.

According to a further aspect, a method for a secure bidirectional exchange of electronic data packets in a network is provided. The method comprises: providing network components, which each have a processor for electronic data processing and are adapted to send and/or receive electronic data packets in a network via data communication links between the network components; providing a first cryptographic key pair for digital signing with a first public and a first private key in a first of the network components; providing a second cryptographic key pair for digital signing with a second public and a second private key for digital signing in a second of the network components; providing a first component ID which uniquely identifies the first network component in the network and providing a second component ID which uniquely identifies the second network component in the network. In the method, the following is also provided for in the first network component: receiving the second public key; providing a first request payload relating to a first request; generating a first electronic request data packet, which comprises the first component ID and the first request payload; generating a first digital signature by digitally signing the first electronic request data packet with the first private key; sending the first electronic request data packet and the first digital request signature from the first network component to the network component; and sending the first public key from the first to the second network component. The following is also provided for in the second network component: receiving the first public key; receiving the first electronic request data packet and the first digital request signature; storing at least the first digital request signature in a second storage device which is assigned to the second network component; providing a first reply payload in response to receiving the first electronic request data packet, wherein the first reply payload relates to a first reply to the first request; generating a first electronic reply data packet which comprises the second component ID, the first reply payload and the first electronic request signature; generating a first digital reply signature by digitally signing the first electronic reply data packet with the second private key; and sending the first electronic reply data packet and the first digital reply signature from the second network component to the first network component. The following is then also provided for in the first network component: receiving the first reply electronic data packet and the first reply digital signature; storing at least the first digital reply signature in a first storage device which is assigned to the first network component; providing a second request payload relating to a second request; generating a second electronic request data packet, which comprises the first component ID, the second request payload and the first digital reply signature; generating a second digital signature by digitally signing the second electronic request data packet with the first private key; and sending the second electronic request data packet and the second digital request signature from the first network component to the second network component.

With respect to the proposed technology, the digital signature for a transmitted electronic data packet is included in a subsequent transmission of a further electronic data packet when electronic data packets are transmitted in succession. The proposed methods secure the transmission of the electronic data packets against manipulation.

In the method for a secure transmission of electronic data packets, the following can also be provided for in the first network component in the context of an nth (n>2) data processing operation: providing an nth payload which is at least different from the first and the second payloads; generating an nth electronic data packet, which comprises the first component ID, the nth payload and an (n−1)th digital signature, which was generated using the first private key for an (n−1)th data packet with an (n−1)th payload, the first component ID and an (n−2)th digital signature; generating an nth digital signature by digitally signing the nth electronic data packet with the first private key; and sending the nth electronic data packet and the nth digital signature from the first network component to the second network component. In the second network component, the nth electronic data packet and the nth digital signature are received and stored in the storage device.

In the method, the following can also be provided for in the second network component: verifying the first electronic data packet using the first public key; verifying the second electronic data packet using the first public key. Furthermore, an evaluation of the first and the second verified electronic data packet can be provided for, wherein at least one of the following checking tasks is carried out: checking whether the first and the second electronic data packets have been received by the same network component, namely the first network component; checking whether the first and the second electronic data packets have been transmitted unchanged from the first to the second network component; and checking whether the first and the second electronic data packets have been received in the order specified by the first network component, i.e. the first before the second electronic data packet.

In the method for a secure transmission of electronic data components, a verification of the nth electronic data packet using the first public key and an evaluation of the nth verified electronic data packet can be provided for in the second network component, wherein at least one of the following checking tasks is carried out: checking whether the nth electronic data packet has been received by the first network component; checking whether the nth electronic data packet has been transmitted unchanged from the first to the second network component; and checking whether the nth electronic data packet has been received in the order specified by the first network component, i.e. the (n−1)th before the nth electronic data packet.

In the method for a secure bidirectional exchange of electronic data packets in the network, the following can also be provided for in the second network component: receiving the second electronic request data packet and the second digital request signature; storing at least the second digital request signature in the second storage device; providing a second reply payload in response to receiving the second electronic request data packet, wherein the second reply payload relates to a second reply to the second request; generating a second electronic reply data packet which comprises the second component ID, the second reply payload and the second electronic request signature; generating a second digital reply signature by digitally signing the second electronic reply data packet with the second private key; sending the second electronic reply data packet and the second digital reply signature from the second network component to the first network component. The second electronic reply data packet and the second digital reply signature are received in the first network component, and at least the second digital reply signature is stored in the first storage device. In addition, the second electronic reply data packet can also be stored in the storage device.

In the method for a secure bidirectional exchange of electronic data packets, the following can be provided for in the second network component: providing a further reply payload which indicates a further reply to the first request; generating a further electronic reply data packet, which comprises the second component ID, the further reply payload and the first electronic reply signature; generating a further digital reply signature by digitally signing the further electronic reply data packet with the second private key; sending the further electronic reply data packet and the further digital reply signature from the second network component to the first network component. The further electronic reply data packet and the further digital reply signature are received in the first network component and at least the further digital reply signature is stored in the first storage device.

It can be provided for that the further electronic reply data packet and the further digital reply signature are generated in the second network component and transmitted to the first network component before the second electronic reply data packet and the second digital reply signature are generated in the second network component.

In the network, the data packets and/or the data relating to the signatures can be transmitted between a sending and a receiving network component on the same or different transmission paths within the network. This makes it possible, for example, to transmit data packets and signatures on different and at least partially separate transmission paths from the sending to the receiving network component, whether simultaneously or consecutively. The verification using the digital signature includes both a verification of the sender (authenticity check) and an integrity check of the data packets (integrity check).

DESCRIPTION OF EMBODIMENTS

Further embodiments are explained below with reference to figures of a drawing. In the drawings.

Figure 1:
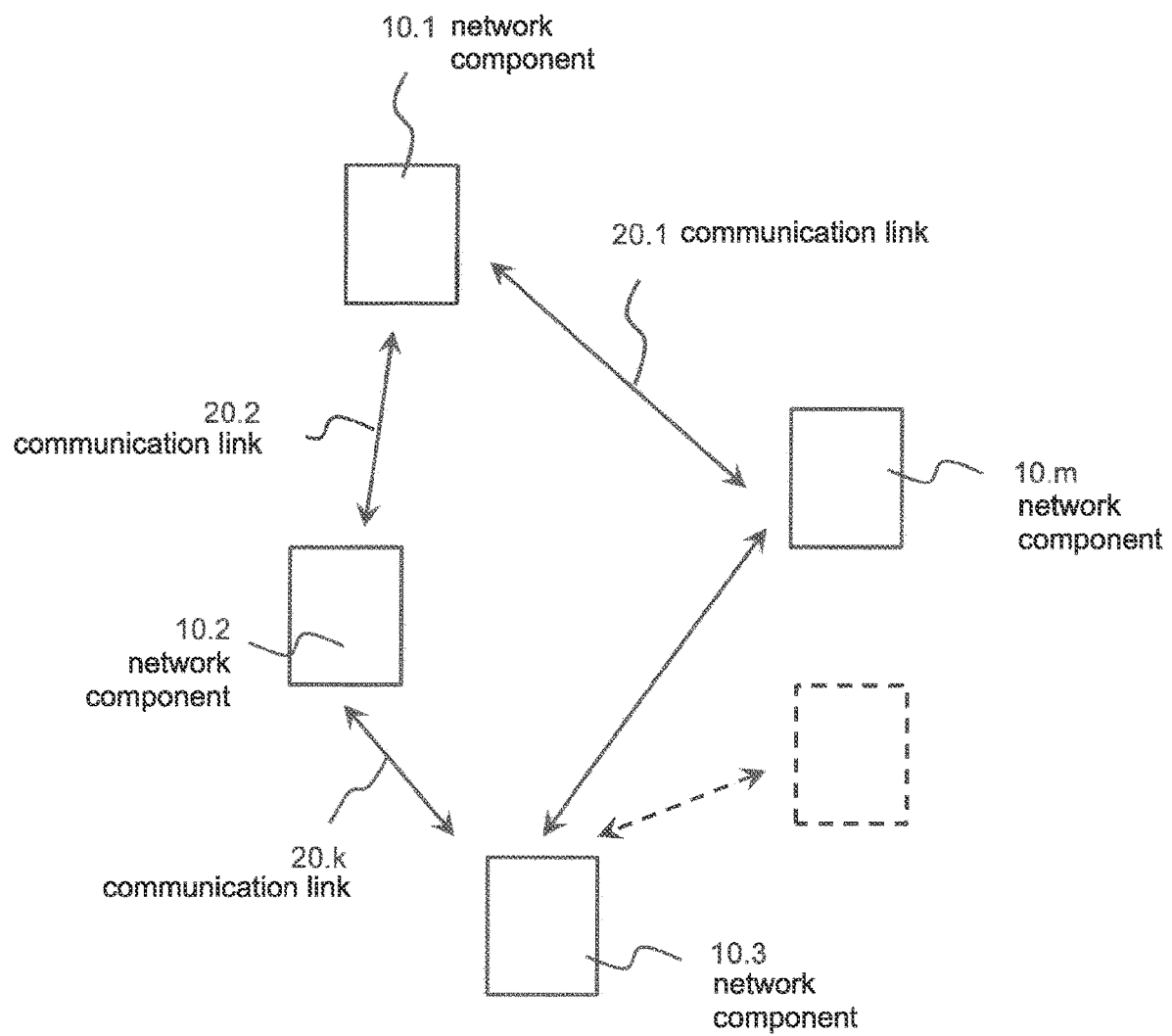
FIG. 1 is a schematic representation of a network with network components between which electronic data packets can be transmitted via data communication links.

FIG. 1 is a schematic representation of an arrangement with network components 10.1, . . . , 10.m (m>2), which are arranged in a network and can exchange electronic data packets via data communication links 20.1, . . . , 20.k (k>2). The network components 10.1, . . . 10.m each have at least one processor which is adapted to process electronic data, for example to generate electronic data packets and to make them available for transmission or to evaluate received electronic data packets.

The data communication links 30.1, . . . , 30.k can be formed in the long term or in the short term between network components, for example limited to individual transmission processes for an electronic data packet.

Figure 2A:
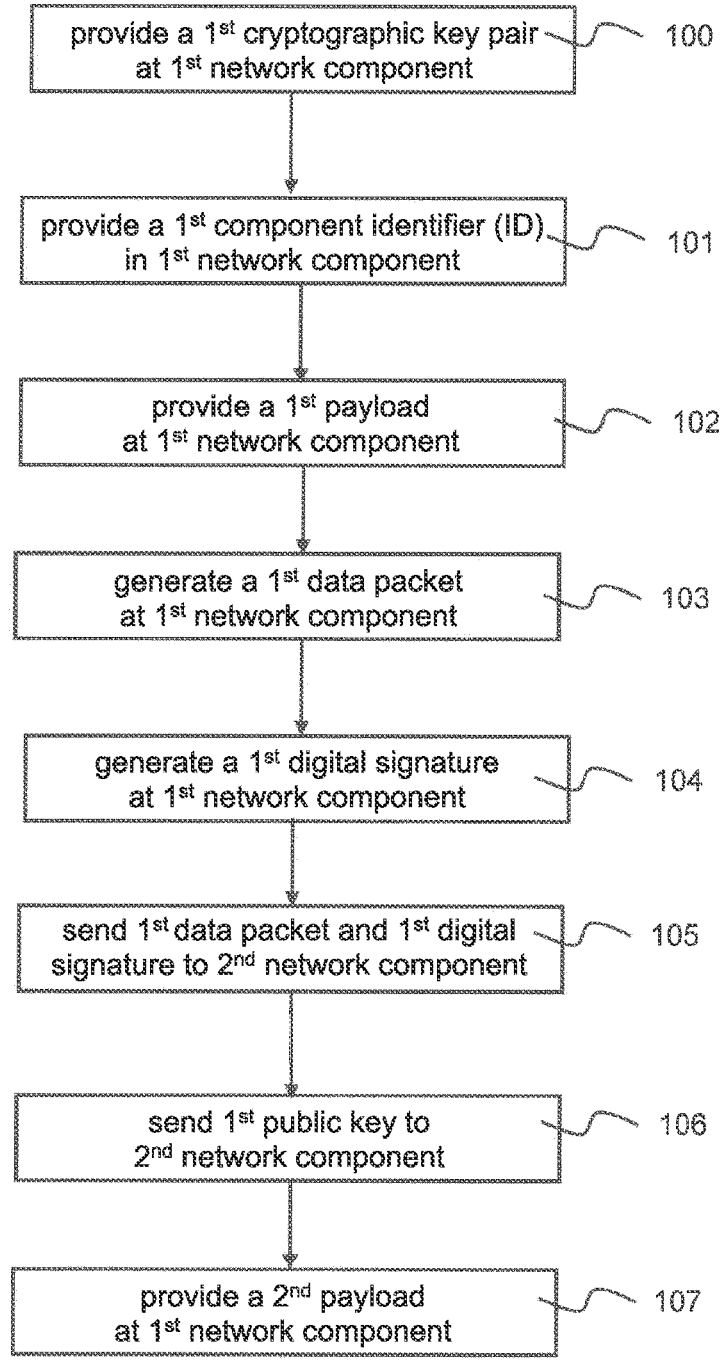
FIGS. 2a to 2c are schematic representations of a method for a secure transmission of electronic data packets in the network and FIGS. 3a to 3e are schematic representations of a method for a bidirectional exchange of electronic data packets in the network.
Figure 2B:
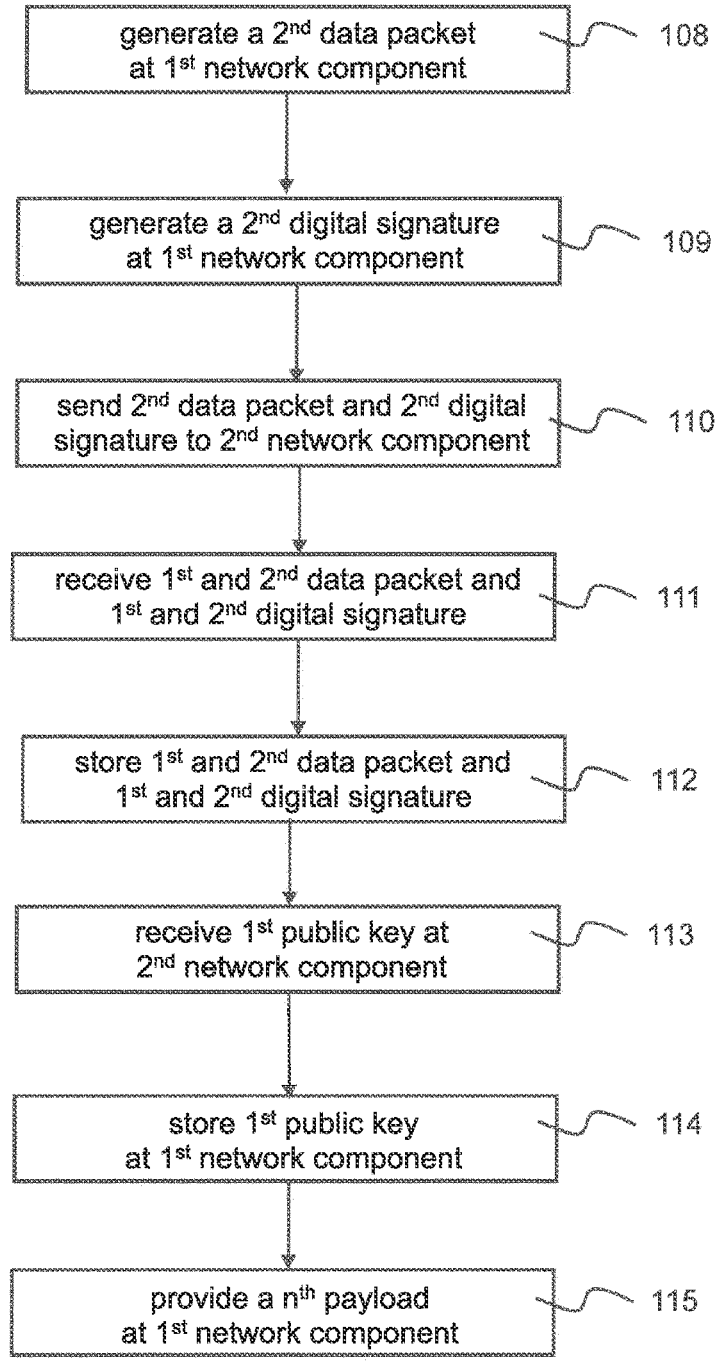
Figure 2C:
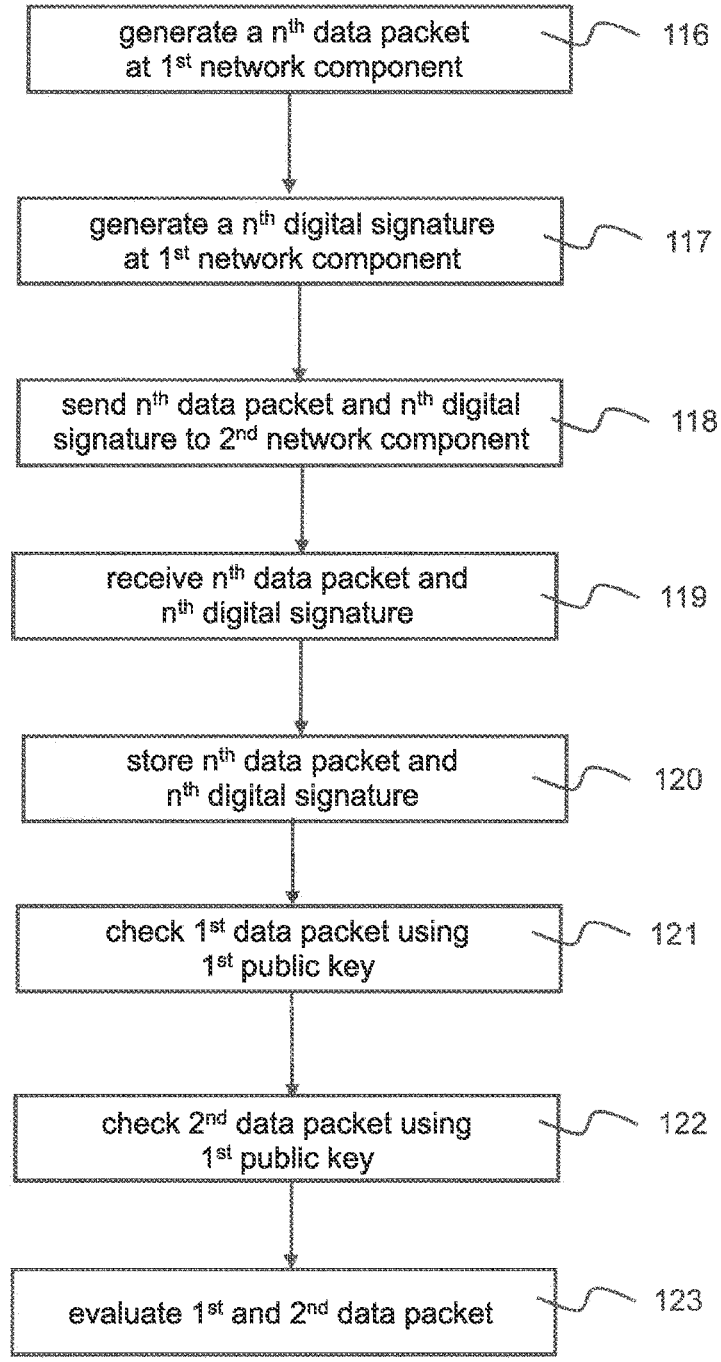
Figure 3A:
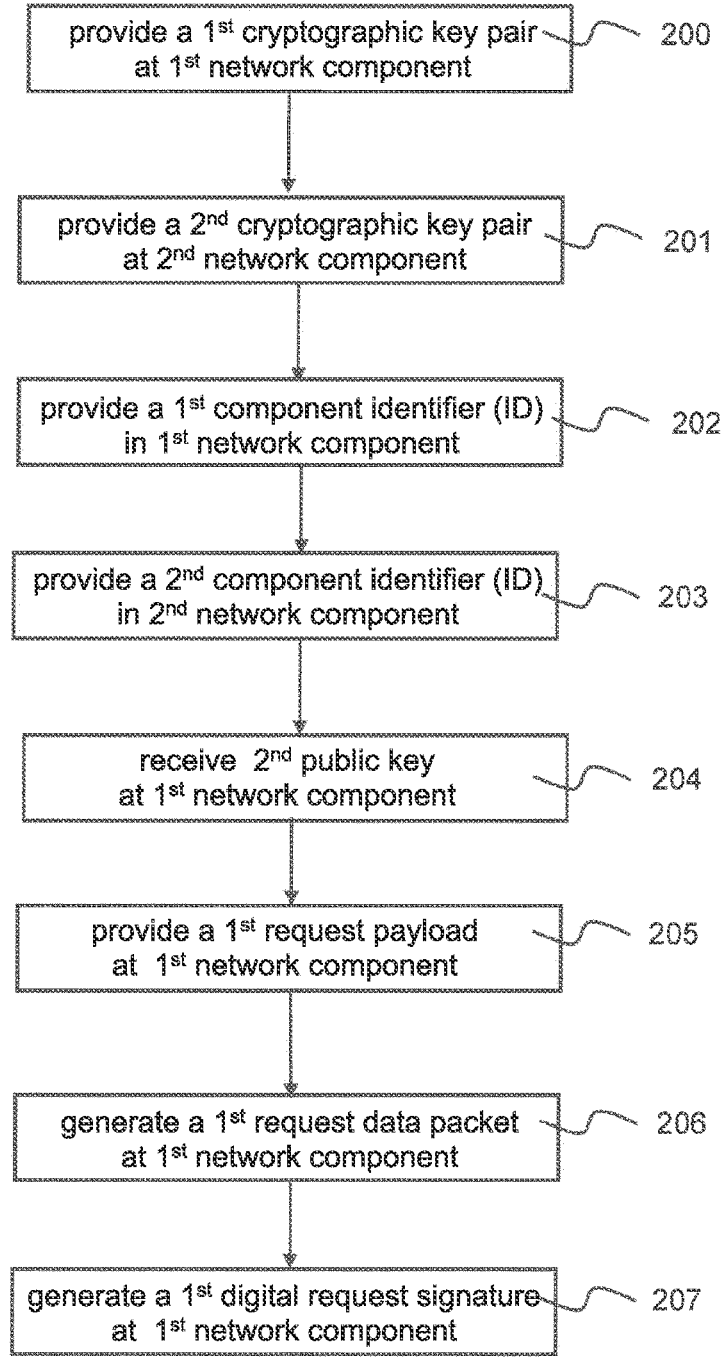
Figure 3B:
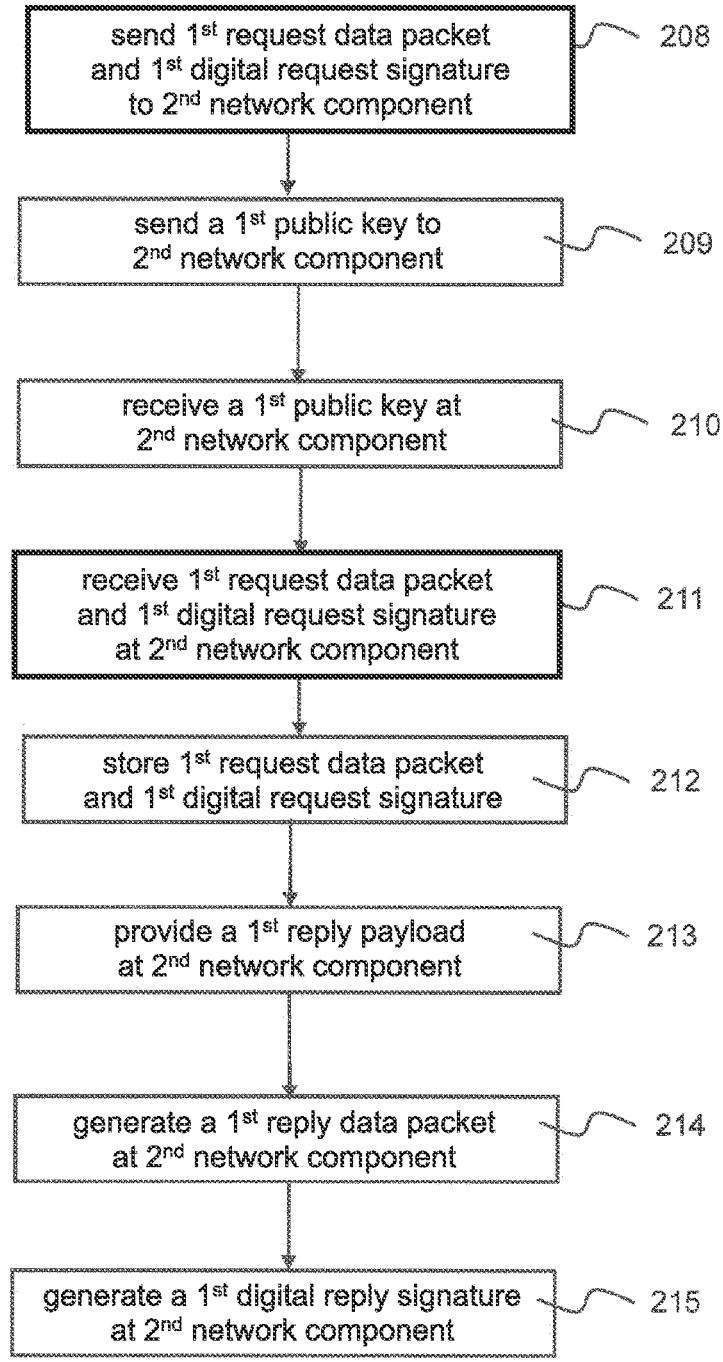
Figure 3C:
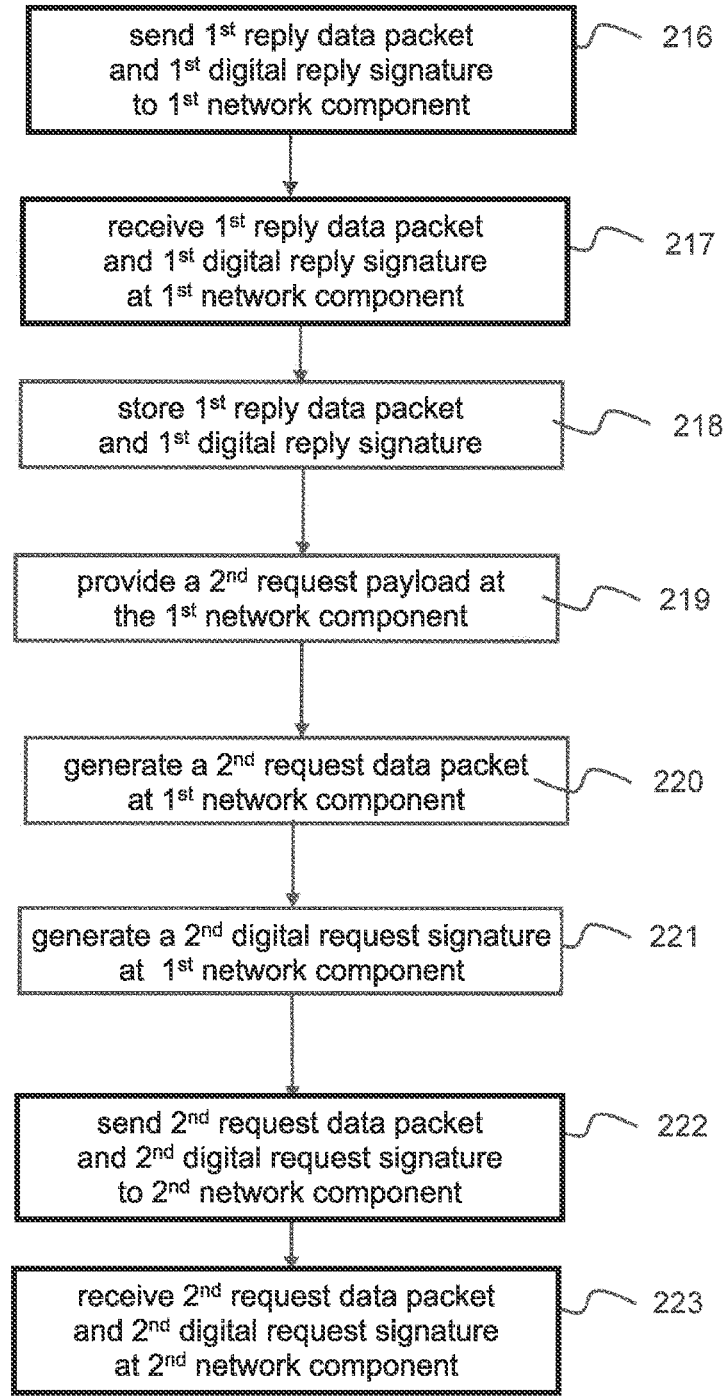
Figure 3D:
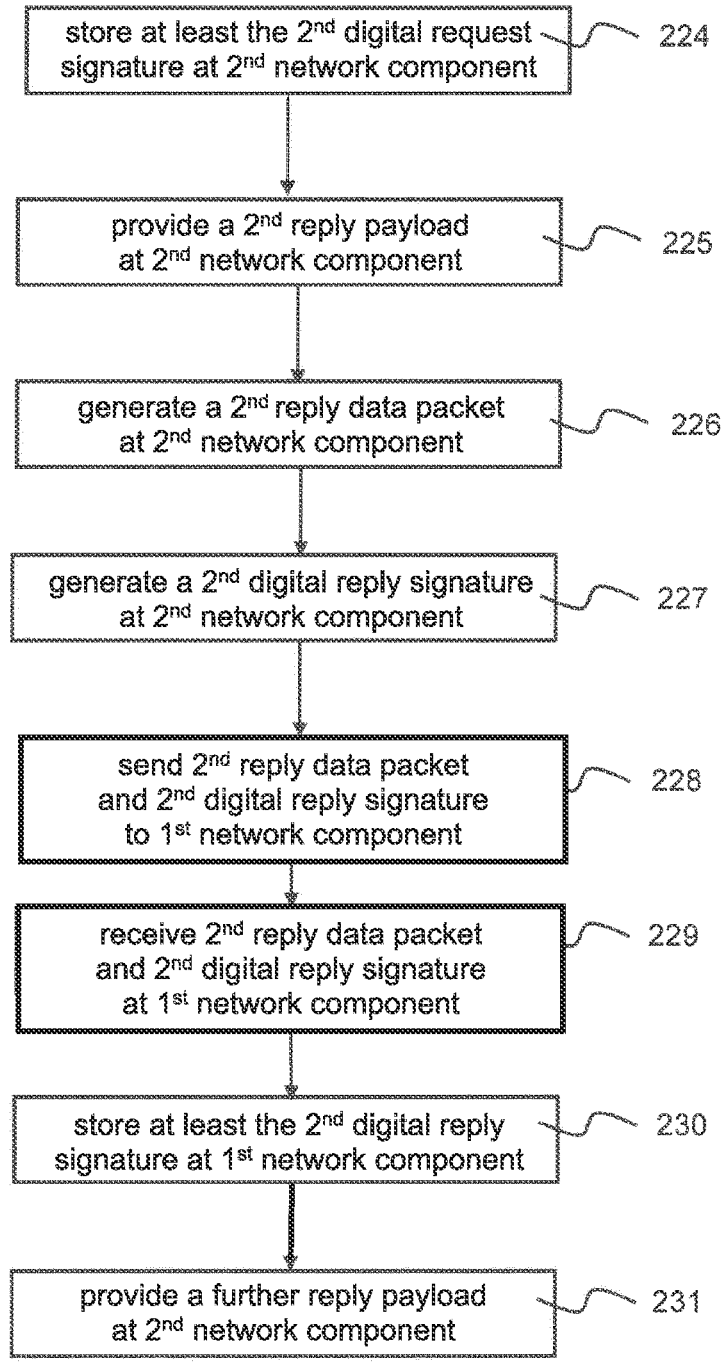
Figure 3E:
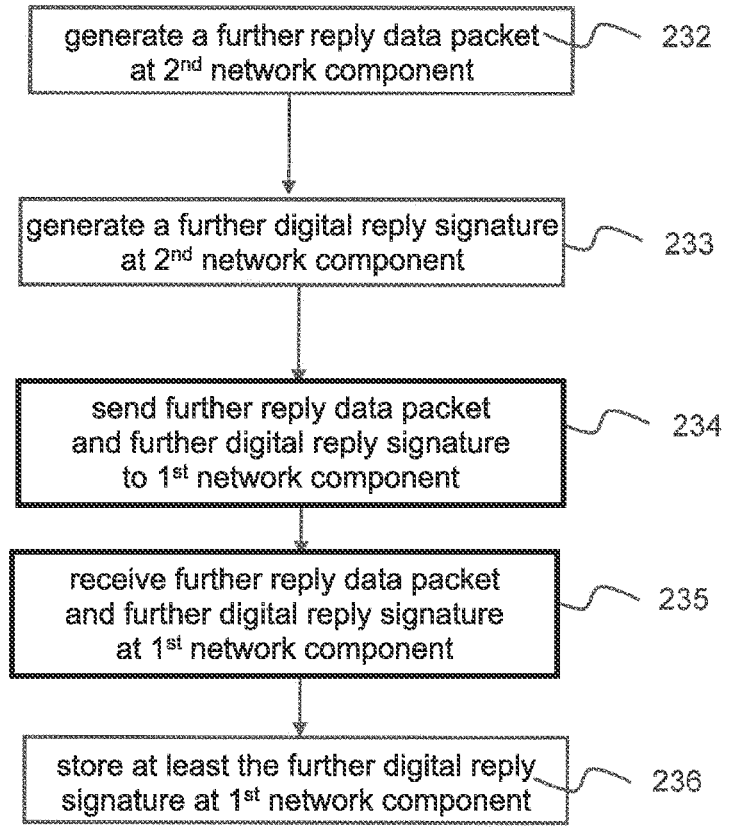

FIG. 2 is a schematic representation of a method for a secure transmission of electronic data packets between two of the network components 10.1, . . . , 10.n, namely, by way of example, between a first network component 10.1 and a second network component 10.2.

Steps in the context of a first data processing operation in the first network component 10.1 are first described below. A first cryptographic key pair for digital signing with a first public and a first private key is provided in step 100. In step 101, a first component ID (ID—identification) is provided, which uniquely identifies the first network component 10.1 in the network. The first payload is provided in step 102. A first electronic data packet is generated (step 103) which comprises the first component ID and the first payload. The payload can relate to any data content, for example measurement data, audio and/or video data. In step 104, a first digital signature is generated by digitally signing the first electronic data packet with the first private key. The first electronic data packet and the first digital signature are sent from the first network component 10.1 to the second network component 10.2 in step 105. Furthermore, in step 106, the first public key is sent from the first to the second network component 10.1, 10.2, wherein it is possible for the public key to be transmitted in advance as soon as the first cryptographic key pair is provided in the first network component.

Further steps in the context of a second data processing operation in the first network component 10.1 are described below. In step 107, the second payload is provided which is different from the first payload. A second electronic data packet is generated (step 108) which comprises the first component ID, the second payload and the first digital signature. In step 109, a second digital signature is generated by digitally signing the second electronic data packet with the first private key. The second electronic data packet and the second digital signature are sent from the first network component 10.1 to the second network component 10.2 (step 110).

In the second network component 10.2, the following is provided for in the method: receiving the first electronic data packet and the first digital signature, as well as the second electronic data packet and the second digital signature (step 111), which can take place simultaneously or consecutively. The first and the second electronic data packets and the first and the second digital signatures are stored in a storage device (step 112) which is assigned to the second network component. The first public key is received in the second network component (step 113) and stored in the storage device (step 114).

In the method for a secure transmission of electronic data packets, an nth (n>2) data processing operation can then also be provided for in the first network component 10.1. This can comprise the following steps: providing an nth payload which is at least different from the first and the second payloads (step 115); generating an nth electronic data packet, which comprises the first component ID, the nth payload and an (n−1)th digital signature, which was generated using the first private key for an (n−1)th data packet with an (n−1)th payload, the first component ID and an (n−2)th digital signature (step 116); generating an nth digital signature by digitally signing the nth electronic data packet with the first private key (step 117); and sending the nth electronic data packet and the nth digital signature from the first network component to the second network component (step 118).

In the second network component, the nth electronic data packet and the nth digital signature are received and stored in the storage device (steps 119, 120).

One or more checking tasks can then be carried out in the second network component 10.2 in order to check the correct and manipulation-free transmission of the electronic data packets. Here it can be provided for to first check (verify) the first electronic data packet in step 121 using the first electronic key to determine whether the transmitted digital signature of the first electronic data packet matches the content of the first electronic data packet. In step 122, such a verification is carried out for the second electronic data packet using the first public key. The data packets received are not only checked for the integrity of the data. Rather, the verification using the digital signature comprises both a verification of the sender (authenticity) and an integrity check of the data packets (integrity).

The first and the second verified electronic data packets can then be evaluated (step 123). At least one of the following checking tasks can be performed: checking whether the first and the second electronic data packets have been received by the same network component, namely the first network component 10.1; checking whether the first and the second electronic data packets have been transmitted unchanged from the first to the second network component 10.1, 10.2; and checking whether the first and the second electronic data packets have been received in the order specified by the first network component 10.1, i.e. the first before the second electronic data packet.

Similarly, the method can provide for the nth electronic data packet to be evaluated and checked.

FIG. 3 is a schematic representation of a method for a secure bidirectional exchange of electronic data packets in the network. In step 200, a first cryptographic key pair for digital signing with a first public and a first private key is provided in the first network component 10.1. In the second network component, in step 201, a second cryptographic key pair is provided for digital signing with a second public and a second private key. In steps 202 and 203, a first component ID and a second component ID are provided in the first and second network components 10.1, 10.2, which uniquely identify the first and second network components in the network.

In the first network component 10.1, the following is provided for in the method: receiving the second public key (step 204); providing a first request payload relating to a first request (step 205); generating a first electronic request data packet which comprises the first component ID and the first request payload (step 206); generating a first digital signature by digitally signing the first electronic request data packet with the first private key (step 207); sending the first electronic request data packet and the first digital request signature from the first network component to the network component (step 208); and sending the first public key from the first to the second network component (step 209).

The following is provided for in the second network component 10.2: receiving the first public key (step 210); receiving the first electronic request data packet and the first digital request signature (step 211); storing at least the first digital request signature in a second storage device which is assigned to the second network component (step 212); providing a first reply payload in response to receiving the first electronic request data packet, wherein the first reply payload relates to a first reply to the first request (step 213); generating a first electronic reply data packet which comprises the second component ID, the first reply payload and the first electronic request signature (step 214); generating a first digital reply signature by digitally signing the first electronic reply data packet with the second private key (step 215); and sending the first electronic reply data packet and the first digital reply signature from the second network component to the first network component (step 216).

The following is also provided for in the first network component 10.1: receiving the first reply electronic data packet and the first reply digital signature (step 217); storing at least the first digital reply signature in a first storage device which is assigned to the first network component (step 218); providing a second request payload relating to a second request (step 219); generating a second electronic request data packet, which comprises the first component ID, the second request payload and the first digital reply signature (step 220); generating a second digital signature by digitally signing the second electronic request data packet with the first private key (step 221); and sending the second electronic request data packet and the second digital request signature from the first network component to the second network component (step 222).

In the method for a secure bidirectional exchange of electronic data packets, the following can also be provided for in the second network component: receiving the second electronic request data packet and the second digital request signature (step 223); storing at least the second digital request signature in the second storage device (step 224); providing a second reply payload in response to receiving the second electronic request data packet, wherein the second reply payload relates to a second reply to the second request (step 225); generating a second electronic reply data packet which comprises the second component ID, the second reply payload and the second electronic request signature (step 226); generating a second digital reply signature by digitally signing the second electronic reply data packet with the second private key (step 227); sending the second electronic reply data packet and the second digital reply signature from the second network component to the first network component (step 228).

The second electronic reply data packet and the second digital reply signature are received in the first network component 10.1 (step 229), and at least the second digital reply signature is stored in the first storage device (step 230).

In addition, the following can be provided for in the method for a bidirectional exchange of data packets in the second network component: providing a further reply payload which indicates a further reply to the first request (step 231); generating a further electronic reply data packet, which comprises the second component ID, the further reply payload and the first electronic reply signature (step 232); generating a further digital reply signature by digitally signing the further electronic reply data packet with the second private key (step 233); sending the further electronic reply data packet and the further digital reply signature from the second network component to the first network component (step 234).

The further electronic reply data packet and the further digital reply signature are received in the first network component 10.1 (step 235) and at least the further digital reply signature is stored (step 236).

The verification of the electronic data packets using a public key on the respective receiver end can then be carried out as described above, wherein one or more of the checking tasks explained can be carried out.

In the process, a relationship of trust is established between the sending network component (producer, for example sensor device) of data packets and all actual and potential receiving network components (receivers). For this purpose, an asymmetrical key pair is provided on the producer (classic asymmetric cryptography) and the public key is communicated to all receivers in the network or provided in such a way that these receivers have efficient and secure access to it. Conversely, in order to establish the trustworthiness of any necessary responses (confirmations or the like) of the receiver, the receiver also generates a key pair and in turn makes the public part available to the data producer (sending network component). Appropriate measures to check ownership of the private key are required (for example Diffie-Hellman-based key exchange).

So that receivers of the data packets can ensure that they originate from the producer of the data packet, all data packets are signed by the producer with their private key and the resulting signature is kept together with the data packet as a "packet" along the entire processing or transmission path. This signature can be checked by the receiver using the public key previously received from the producer (it is not possible to create signatures with the public key). This solves two important problems: (i) the integrity of the data packets is ensured, since a manipulation of data packets or signature would lead to an error in the check; and (ii) the authenticity of the data packets (originally produced by the sending network component) is ensured.

This means that manipulation over the entire data transmission is excluded (or can be determined simply by checking the signature) and the origin of the data packets is ensured (only this sender has ownership of the private key required to generate this signature). As long as both parties (producer and receiver, i.e. sending and receiving network components) have previously completed the exchange and verification of the respective key, the transmission via unsecured, untrustworthy or unauthenticated data paths does not lead to a restriction of the trustworthiness of the data.

The one-time sealing of the data by the sender ensures the trustworthiness of all further actual and potential processing steps.

In the following, explanations in connection with securing the integrity, authenticity and sequence in data transmission are explained. The following abbreviations are used: S—sender (sending network component); R—receiver (sending network component); sig[n,X]—nth signature of X; $ID_x$—identification feature of device x; payload n—"payload" of the nth data packet.

The prerequisite is that the sender S has generated a key pair from a secret key and a public key. The sender has generated a unique $ID_s$ in the network or received it during manufacture; the receiver R had access to the public key of the sender S before receiving the first data packet. Methods for a secure exchange of the public keys of key pairs in the context of asymmetric cryptography are known as such in various embodiments.

The sender would like to transmit several data packets (more than one) to the receiver and this data (payload 1, payload 2 etc.) is available. The method for transmitting the multiple data packets can then be shown schematically as follows:

| | |
|---|---|
| 1) Initial (data packet 1 from S --> R): | $[ID_S, 0, \text{payload } 1]^{sig[1, S]}$ |
| 2) Sequence 1 (data packet 2 from S --> R): | $[ID_S, sig[1, S], \text{payload } 2]^{sig[2, S]}$ |
| ... | |
| n) Sequence n (data packet n + 1): | $[ID_S, sig[n, S], \text{payload } n]^{sig[n+1, S]}$ |

Accepting the signature of the previous data packet and the signature on each individual data packet enables the receiver to ensure that (i) all packets come from the same sender (S); (ii) all packets have been transmitted unchanged; and (iii) all packets have been received in the sequence initiated by the sender.

R always saves the last signature sig[n,S] for each sender.

Authenticity is given if both partners, i.e. the sender and receiver, trust the other partner through a previous check of the public key. It is then irrelevant which partner is the sender and receiver during the transmission. The data transmission can take place in both directions with the given safeguards.

With this type of data transmission, it is also irrelevant how many receivers received and forwarded the date. The trustworthiness of the data can be checked at any point in the transmission or in the processing steps.

An application of bidirectional protection of the transmission of data packets in the network is explained below.

The following requirements should apply:
a. The sender S and receiver R have each generated a key pair from a secret key and a public key. The sender S and receiver R have each generated a unique ID or received it during manufacture (hardware ID).
b. The receiver R had access to the public key of the sender S before receiving the first data packet. Before receiving the first data packet, the sender S has been given access to the public key of the receiver R. Methods for a secure exchange of the public keys of key pairs in the context of asymmetric cryptography are known as such in various embodiments.
c. Program code on the sender would like to transmit several data packets (more than one) to the receiver and this data (payload 1, payload 2 etc.) is available.

In a case A, a simple request-reply cycle without continuity is assumed. The result is as follows:
1. Initial (data packet 1)
   S→R [IDS, 0, REQUEST 1]sig[1,S]
   S←R [IDE, sig[1,S], REPLY 1]sig[1,R]
   S←R [IDE, sig[1,R], REPLY 1a]sig[2,R] (option)
2. Sequence 1 (data packet 2)
   S→R [ID, sig[1,S], REQUEST2]sig[2,S]
   S←R [IDE, sig[2,S], REPLY2]sig[2,R]
n. Sequence n (data packet n+1)
   S→R [ID, sig[n,S], REQUESTn]sig[n+1,S]
   S←R [IDE, sig[n+1,5], REPLYn]sig[n+1,R]

Case A gives, in addition to process 1, the assurance to the sender that the reply to a request was really only made to this request. Once the correct REPLY has been received, no further REPLY will be accepted on this request. If a REQUEST triggers multiple REPLYs, these must in turn be chained together.

The receiver R always saves the last signature sig[n,S] for each sender.

In a case B, complete protection of bidirectional data communication is provided for. The result is as follows:
1. Initial (data packet 1)
   S→R [IDS, 0, REQUEST 1]sig[1,S]
   S←R [IDE, sig[1,S], REPLY 1]sig[1,R]
2. Sequence 1 (data packet 2)
   S→R [ID, sig[1,R], REQUEST2]sig[2,S]
   S←R [IDE, sig[2,S], REPLY2]sig[2,R]
n. Sequence n (data packet n+1)
   S→R [ID, sig[n,R], REQUEST n]sig[n+1,S]
   S←R [IDE, sig[n+1,S], REPLY n]sig[n+1,R]

Case B ensures a REQUEST/REPLY sequence with absolute trustworthiness of the sequence in both directions. The receiver R must always save the last signature sig[n,S] for each sender.

The features of the invention disclosed in the above description, the claims and the drawings can be important both individually and in any combination for the implementation of the invention in its various embodiments.

The invention claimed is:

1. A method that is to secure transmission of electronic data packets in a network, the method comprising:
   providing network components, each processor to process electronic data and to cause sending and/or receiving electronic data packets in a network via data communication links between the network components;
   using the processor of a first network component of the network components to perform first data processing operations, including:
   providing a first cryptographic key pair compromising a first public key and a first private key;
   providing a first component identifier that uniquely identifies the first network component in the network;
   providing a first payload;
   generating a first electronic data packet that comprises the first component identifier and the first payload;
   digitally signing the first electronic data packet that comprises the first component identifier and the first payload with the first private key to generate a first digital signature;

causing transmission of the first electronic data packet and the first digital signature from the first network component to a second network component of said network components; and
causing transmission of the first public key from the first network component to the second network component; and
using the processor of the first network component to perform second data processing operations, including:
providing a second payload that is different from the first payload;
generating a second electronic data packet that comprises the first component identifier, the second payload and the first digital signature;
digitally signing the second electronic data packet that comprises the first component identifier, the second payload and the first digital signature with the first private key to generate a second digital signature; and
causing transmission of the second electronic data packet and the second digital signature to the second network component; and
using the processor of the second network component to perform third data processing operations, including:
receiving the first electronic data packet and the first digital signature:
receiving the second electronic data packet and the second digital signature; storing the first electronic data packet and the first digital signature as well as the second electronic data packet and the second digital signature in a storage device which is assigned to the second network component;
receiving the first public key;
causing storage of the first public key, the first electronic data packet, the first digital signature, the second electronic data packet and the second digital signature in a the storage device that is associated with the second network component;
verifying integrity of the first electronic data packet using the first public key and the first digital signature;
verifying integrity of the second electronic data packet using the first public key and the second digital signature; and
evaluating the first and the second verified electronic data packets, wherein evaluating includes at least one of the following:
checking whether the first and the second electronic data packets have been transmitted by the same network component, that is the first network component;
checking whether the first electronic data packet and the second electronic data packet have not been changed in transmission from the first network component to the second network component; and
verifying the order of the first data packet and the second electronic data packet based on the contents of the first data packet and the second electronic data packet.

2. The method according to claim 1, further comprising:
using the processor of the first network component to perform $n^{th}$ (n>2) data processing operations, including:
providing an $n^{th}$ payload which is at least different from the first and the second payloads;
generating an $n^{th}$ electronic data packet, that comprises the first component identifier, the $n^{th}$ payload and an $(n-1)^{th}$ digital signature generated using the first private key for an $(n-1)^{th}$ data packet, said $(n-1)^{th}$ data packet comprising an $(n-1)^{th}$ payload, the first component identifier and an $(n-2)^{th}$ digital signature;

generating an $n^{th}$ digital signature by digitally signing the $n^{th}$ electronic data packet with the first private key; and
causing transmission of the $n^{th}$ electronic data packet and the $n^{th}$ digital signature to the second network component; and
using the processor of the second network component to perform one or more further data processing operations, including:
receiving the $n^{th}$ electronic data packet and the $n^{th}$ digital signature; and
causing storage of the $n^{th}$ electronic data packet and the $n^{th}$ digital signature in the storage device.

3. The method according to claim 1, further comprising:
using the processor of the second network component to perform further data processing operations, including:
verifying integrity of the first electronic data packet using the first public key and the first digital signature;
verifying integrity of the second electronic data packet using the first public key and the second digital signature; and
evaluating the first and the second verified electronic data packets, wherein evaluating includes at least one of the following:
checking whether the first and the second electronic data packets have been transmitted by the same network component, that is the first network component;
checking whether the first electronic data packet and the second electronic data packet have not been changed in transmission from the first network component to the second network component; and
verifying the order of the first data packet and the second electronic data packet based on the contents of the first data packet and the second electronic data packet.

4. The method according to claim 2, further comprising:
using the processor of the second network component to perform further data processing operations, including:
verifying data integrity of the $n^{th}$ electronic data packet using the first public key and the $n^{th}$ digital signature;
evaluating the $n^{th}$ verified electronic data packet, wherein evaluating includes at least one of the following:
checking whether the $n^{th}$ electronic data packet has been transmitted by the first network component;
checking whether the $n^{th}$ electronic data packet has not been changed in transmission from the first network component to the second network component; and
checking whether the $n^{th}$ electronic data packet has after the (n-1)th electronic data packet based on the contents of the $(n-1)^{th}$ electronic data packet and the $n^{th}$ electronic data packet.

5. A method that is to secure bidirectional exchange of electronic data packets in a network, the method comprising:
providing a plurality of network components, each network component of said network components compromising a processor to process electronic data and to cause sending and/or receiving electronic data packets in a network via data communication links between the network components;
wherein the processor of a first network component of said network components to perform data processing operations, including:
providing a first cryptographic key pair for digital signing, the first cryptographic key pair compromising a first public key and a first private key; and
providing a first component identifier that uniquely identifies the first network component in the network;

wherein the processor of a second network component of said network components to perform data processing operations, including:
providing a second cryptographic key pair for digital signing, the first cryptographic key pair comprising a second public key and a second private; and
providing a second component identifier that uniquely identifies the second network component in the network;
wherein the processor of the first network component is to perform further data processing operations including:
receiving the second public key;
providing a first request payload associated with a first request;
generating a first electronic request data packet that comprises the first component identifier and the first request payload;
generating a first digital signature by digitally signing the first electronic request data packet comprising the first component identifier and the first request payload with the first private key;
causing transmission of the first electronic request data packet and the first digital request signature to the network component; and
causing transmission of the first public key to the second network component;
wherein the processor of the second network component is to perform further data processing operations, including:
receiving the first public key;
receiving the first electronic request data packet comprising the first component identifier and the first request payload and a first digital request signature;
storing at least the first digital request signature in a second storage device that is associated with the second network component;
in response to receiving the first electronic request data packet, providing a first reply payload that is associated with the first request payload;
generating a first electronic reply data packet which comprises the second component identifier, the first reply payload and the first electronic request signature;
generating a first digital reply signature by digitally signing the first electronic reply data packet comprising the second component identifier, the first reply payload and the first electronic request signature with the second private key; and
cause sending the first electronic reply data packet and the first digital reply signature to the first network component; and
wherein the processor of the first network component is to perform further data processing operations, including:
receiving the first reply electronic data packet and the first reply digital signature;
storing at least the first digital reply signature in a first storage device that is assigned to the first network component;
providing a second request payload relating to a second request;
generating a second electronic request data packet that comprises the first component identifier, the second request payload and the first digital reply signature;
generating a second digital signature by digitally signing the second electronic request data packet comprising the first component identifier, the second request payload and the first digital reply signature with the first private key; and
causing transmission of the second electronic request data packet and the second digital request signature to the second network component;
wherein the processor of the second network component to perform further data processing operations, including:
verifying integrity of the first electronic data packet using the first public key and the first digital signature;
verifying integrity of the second electronic data packet using the first public key and the second digital signature; and
evaluating the first and the second verified electronic data packets, wherein evaluating includes at least one of the following:
checking whether the first and the second electronic data packets have been transmitted by the same network component, that is the first network component;
checking whether the first electronic data packet and the second electronic data packet have not been changed in transmission from the first network component to the second network component; and
verifying the order of the first data packet and the second electronic data packet based on the contents of the first data packet and the second electronic data packet.

6. The method according to claim 5, wherein the processor of the second network component is to perform further data processing operations, including:
receiving the second electronic request data packet and the second digital request signature;
causing storage of at least the second digital request signature in the second storage device;
providing a second reply payload in response to receiving the second electronic request data packet, wherein the second reply payload relates to a second reply to the second request;
generating a second electronic reply data packet which comprises the second component identifier, the second reply payload and the second electronic request signature;
generating a second digital reply signature by digitally signing the second electronic reply data packet with the second private key; and
sending the second electronic reply data packet and the second digital reply signature from the second network component to the first network component; and
wherein the processor of the first network component is to perform further data processing operations, including:
receiving the second electronic reply data packet and the second digital reply signature; and
storing at least the second digital reply signature in the first storage device.

7. The method according to claim 5, further comprising:
wherein the processor of the second network component is to perform further data processing operations, including:
providing a further reply payload indicates a further reply to the first request;
generating a further electronic reply data packet that comprises the second component identifier, the further reply payload and the first electronic reply signature;
generating a further digital reply signature by digitally signing the further electronic reply data packet with the second private key;
sending the further electronic reply data packet and the further digital reply signature from the second network component to the first network component; and wherein the processor of the first network component is further to:
receiving the further electronic reply data packet and the further digital reply signature; and
storing at least the further digital reply signature in the first storage device.

8. The method according to claim 7, wherein the further electronic reply data packet and the further digital reply signature are generated in the second network component and transmitted to the first network component before the second electronic reply data packet and the second digital reply signature are generated in the second network component.

9. A system to provide a secure transmission of electronic data packets in a network, comprising:
a processor of a first network component to process electronic data and to send and/or receive electronic data packets in a network via data communication links between network components, wherein the processor is to cause the first network component performing a first data processing operations, including:
providing a first cryptographic key pair for digital signing with a first public and a first private key;
providing a first network component identifier that uniquely identifies the network component implemented by the apparatus in the network;
providing a first payload;
generating a first electronic data packet that comprises the first component identifier and the first payload;
generating a first digital signature by digitally signing the first electronic data packet with the first private key;
sending the first electronic data packet and the first digital signature to another one of the network components; and
sending the first public key from the first to said other network component; and
wherein the processor is to further cause the first network component performing second data processing operations, comprising:
providing a second payload that is different from the first payload;
generating a second electronic data packet that comprises the first component identifier, the second payload and the first digital signature;
generating a second digital signature by digitally signing the second electronic data packet comprising the first component identifier, the second payload and the first digital signature with the first private key;
sending the second electronic data packet and the second digital signature to said other network component;
wherein a processor of the other network component is to cause the other network component performing third data processing operations, including:
verifying integrity of the first electronic data packet using the first public key and the first digital signature;
verifying integrity of the second electronic data packet using the first public key and the second digital signature; and
evaluating the first and the second verified electronic data packets, wherein evaluating includes at least one of the following:
checking whether the first and the second electronic data packets have been transmitted by the same network component, that is the first network component;
checking whether the first electronic data packet and the second electronic data packet have not been changed in transmission from the first network component to the other network component; and
verifying the order of the first data packet and the second electronic data packet based on the contents of the first data packet and the second electronic data packet.

10. The apparatus according to claim 9, wherein the processor of the first network component is to perform $n^{th}$ ($n>2$) data processing operations, including:
providing an $n^{th}$ payload that is at least different from the first payload and the second payload;
generating an $n^{th}$ electronic data packet, that comprises the first component identifier, the $n^{th}$ payload and an $(n-1)^{th}$ digital signature generated using the first private key for an $(n-1)^{th}$ data packet, said $(n-1)^{th}$ data packet comprising an $(n-1)^{th}$ payload, the first component identifier and an $(n-2)^{th}$ digital signature;
generating an $n^{th}$ digital signature by digitally signing the $n^{th}$ electronic data packet with the first private key; and
causing transmission of the $n^{th}$ electronic data packet and the $n^{th}$ digital signature to the other network component.

11. An apparatus to provide a secure transmission of electronic data packets in a network, comprising:
a processor to process electronic data and to send and/or receive electronic data packets in a network via data communication links between network components, the apparatus to implement one of said network components;
wherein the processor is to cause the apparatus performing data processing operations, including:
receiving a first electronic data packet and a first digital signature, wherein the first electronic data packet comprises a network component identifier uniquely identifying another one of said network components and a first payload, and wherein the first digital signature digitally signs the network component identifier uniquely identifying the other network component and the first payload of said first electronic data packet with a private key of a cryptographic key pair associated with the other network component;
receiving a second electronic data packet and a second digital signature, wherein the second electronic data packet comprises the network component identifier uniquely identifying the other network component, a second payload and said first digital signature, wherein the second digital signature digitally signs the network component identifier uniquely identifying the other network component, the second payload and said first digital signature of said second electronic data packet with said private key of the cryptographic key pair associated with said other network component;
receiving a public key of said cryptographic key pair associated with said other network component; and
verifying integrity of the first electronic data packet using the first public key and the first digital signature;
verifying integrity of the second electronic data packet using the first public key and the second digital signature; and
evaluating the first and the second verified electronic data packets, wherein evaluating includes at least one of the following:
checking whether the first and the second electronic data packets have been transmitted by the same network component, that is the first network component;
checking whether the first electronic data packet and the second electronic data packet have not been changed in transmission from the first network component to the second network component; and verifying the order of the first data packet and the second electronic data packet based on the contents of the first data packet and the second electronic data packet;

the apparatus is further associated with a storage device to store the received public key of said cryptographic key pair, the received first electronic data packet, the received first digital signature, the received second electronic data packet and the received second digital signature.

12. The apparatus according to claim 11, wherein the processor of the apparatus is to perform one or more further data processing operations, including:

receiving an $n^{th}$ ($n>2$) electronic data packet and an $n^{th}$ digital signature, wherein the $n^{th}$ electronic data packet comprises a first component identifier uniquely identifying said other network component, an $n^{th}$ payload that is different from the first payload and second payload, and an $(n-1)^{th}$ digital signature generated using said private key for an $(n-1)^{th}$ data packet, said $(n-1)^{th}$ data packet comprising an $(n-1)^{th}$ payload, the network component identifier uniquely identifying said other network component and an $(n-2)^{th}$ digital signature; and causing storage of the $n^{th}$ electronic data packet and the $n^{th}$ digital signature in the storage device.

13. The apparatus according to claim 11, wherein the processor of the apparatus is to perform further data processing operations, including:

verifying integrity of the first electronic data packet using the first public key and the first digital signature;

verifying integrity of the second electronic data packet using the first public key and the second digital signature; and evaluating the first and the second verified electronic data packets, wherein evaluating includes at least one of the following:

checking whether the first and the second electronic data packets have been transmitted by the same network component, that is the first network component;

checking whether the first electronic data packet and the second electronic data packet have not been changed in transmission from the first network component to the second network component; and verifying the order of the first data packet and the second electronic data packet based on the contents of the first data packet and the second electronic data packet.

14. The apparatus according to claim 12, wherein the processor of the apparatus is to perform further data processing operations, including:

verifying data integrity of the $n^{th}$ electronic data packet using the first public key and the $n^{th}$ digital signature;

evaluating the $n^{th}$ verified electronic data packet, wherein evaluating includes at least one of the following:

checking whether the $n^{th}$ electronic data packet has been transmitted by the first network component;

checking whether the $n^{th}$ electronic data packet has not been changed in transmission from the first network component to the second network component; and checking whether the $n^{th}$ electronic data packet has after the $(n-1)^{th}$ electronic data packet based on the contents of the $(n-1)^{th}$ electronic data packet and the $n^{th}$ electronic data packet.

* * * * *